US010786900B1

(12) United States Patent
Bohez et al.

(10) Patent No.: US 10,786,900 B1
(45) Date of Patent: Sep. 29, 2020

(54) ROBOT CONTROL POLICY DETERMINATION THROUGH CONSTRAINED OPTIMIZATION FOR SMOOTH CONTINUOUS CONTROL

(71) Applicant: DeepMind Technologies Limited, London (GB)

(72) Inventors: Steven Bohez, London (GB); Abbas Abdolmaleki, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/586,846

(22) Filed: Sep. 27, 2019

Related U.S. Application Data

(60) Provisional application No. 62/737,855, filed on Sep. 27, 2018.

(51) Int. Cl.
  *B25J 9/16* (2006.01)
  *G06F 17/11* (2006.01)
  *G05B 13/02* (2006.01)
  *G06N 20/00* (2019.01)

(52) U.S. Cl.
  CPC .......... *B25J 9/163* (2013.01); *G05B 13/0265* (2013.01); *G06F 17/11* (2013.01); *G06N 20/00* (2019.01)

(58) Field of Classification Search
  None
  See application file for complete search history.

(56) References Cited

PUBLICATIONS

Tessler, C. et al., "Reward Constrained Policy Optimization," downloaded from <arxiv.org/abs/1805.11074> with an upload date of May 28, 2018 (2018) 13 pp. (Year: 2018).*
Gabor, Z. et al., "Multi-criteria Reinforcement Learning," Proc. of the 15th Intl. Conf. on Machine Learning ICLM, (1998, revised 2004) 9 pp. (Year: 2004).*
Wilde et al., "Constrained Optimization," course notes from <http://www.columbia.edu/~md3405/Constrained_Optimization.pdf> and verified available as of Mar. 2017 by web.archive.org, 9 pp. (Year: 2013).*
Bartlett, P., "Constrained Optimization," course notes from <people.eecs.berkeley.edu/~bartlett/courses/281b-sp08/5.pdf> and verified available as of Jun. 2016 by web.archive.org, 5 pp. (Year: 2008).*
Frankhauser, P. et al., "Reinforcement Learning of Single Legged Locomotion," 2013 IEEE/RSJ Intl. Conf. on Intelligent Robots and Systems (IROS 2013) pp. 188-193. (Year: 2013).*
Zhang, M. et al., "Deep Reinforcement Learning for Tensegrity Robot Locomotion," 2017 IEEE Intl. Conf. on Robotics and Automation (ICRA 2017) pp. 634-641. (Year: 2017).*
Martin, P. et al., "Robot arm reaching through neural inversions and reinforcement learning," Robotics and Autonomous Systems, vol. 31. (2000) pp. 227-246. (Year: 2000).*

(Continued)

*Primary Examiner* — Kakali Chaki
*Assistant Examiner* — Brian M Smith
(74) *Attorney, Agent, or Firm* — Fish & Richardson P.C.

(57) ABSTRACT

Methods, systems, and apparatus, including computer programs encoded on computer storage media, for determining a control policy for a vehicles or other robot through the performance of a reinforcement learning simulation of the robot.

26 Claims, 4 Drawing Sheets

(56) References Cited

PUBLICATIONS

Van Hoof, H. et al., "Learning of Non-Parametric Control Policies with High-Dimensional State Features," Proc. of the 18th Intl. Conf. on Artificial Intelligence and Statistics (AISTATS 2015) pp. 995-1003. (Year: 2015).*

Abdolmaleki et al., "Maximum a Posteriori Policy Optimisation" International Conference on Learning Representations, 2018, 23 pages.

Achiam et al., "Constrained Policy Optimization" Proceedings of the 34th International Conference on Machine Learning, pp. 22-31, 2017, 10 pages.

Altman, "Constrained Markov Decision Processes" Chapman and Hall, 1999, 250 pages.

Amodei et al., "Concrete problems in AI safety" arXiv: 1606.0656, 2016, 29 pages.

Anonymous, "Success At Any Cost: Value Constrained Model-Free Continuous Control" ICLR, 2019, 15 pages.

Dalal et al., "Safe exploration in continuous action spaces" CoRR, abs/1801.08757, 2018, 9 pages.

De et al., "The Penn Jerboa: A platform for exploring parallel composition of templates" CoRR, abs/1502.05347, 2015, 25 pages.

Deb, "Multi-objective optimization" Search Methodologies, pp. 403-449, 2014, 47 pages.

Kenneally et al., "Design principles for a family of direct-drive legged robots" IEEE Robotics and Automation Letters, 1(2):900-907, Jul. 2016, 10 pages.

Levine et al., "Guided policy search" Proceedings of the 30th International Conference on Machine Learning, 2013, 10 pages.

Mannor et al., "A geometric approach to multi-criterion reinforcement learning" Journal of Machine Learning Research, 5:325-360, Dec. 2004, 36 pages.

Munos et al., "Safe and efficient off-policy reinforcement learning" Advances in Neural Information Processing Systems 29: Annual Conference on Neural Information Processing Systems, 2016, 9 pages.

Peters et al., "Relative entropy policy search" 24th AAAI Conference on Artificial Intelligence, 2010, 6 pages.

Popov et al., "Data-efficient deep reinforcement learning for dexterous manipulation" CoRR, abs/1704.03073, 2017, 12 pages.

Roijers et al., "A survey of multi-objective sequential decision-making" Journal of Artificial Intelligence Research, 48(1):67-113, Oct. 2013, 47 pages.

Schulman et al., "Trust region policy optimization" Proceedings of the 32nd International Conference on Machine Learning, vol. 37, pp. 1889-1897, 2015, 16 pages.

Sutton et al., "Introduction to Reinforcement Learning" MIT Press, 1998, 20 pages.

Tan et al., "Sim-to-real: Learning agile locomotion for quadruped robots" Robotics: Science and Systems, 2018, 11 pages.

Tassa et al., DeepMind Control Suite CoRR, abs/1801.00690, 2018, 24 pages.

Tessler et al., Reward constrained policy optimization, CoRR, abs/1805.11074, 2018, 15 pages.

Tobin et al., "Domain randomization for transferring deep neural networks from simulation to thre real world" CoRR, abs/1703.06907, 2017, 8 pages.

Todorov et al., "Mujoco: A physics engine for model-based control" 2012 IEEE/RSJ International Conference on Intelligent Robots and Systems, pp. 5026-5033, 2012, 8 pages.

Mossalam et al., "Multi-objective deep reinforcement learning" CORR, abs/1610.02707, Oct. 2016, 9 pages.

* cited by examiner

1: given $Q_r\left(s, a; \psi_r^{(0)}, \phi^{(0)}\right)$, $Q_c\left(s, a; \psi_c^{(0)}, \phi^{(0)}\right)$, $\Lambda\left(s; \psi_\lambda^{(0)}, \phi^{(0)}\right)$, $\pi(a|s; \theta^{(0)})$, with $\psi_r^{(0)}$, $\phi^{(0)}$ and $\theta^{(0)}$ initial weights, and replay buffer $\mathcal{D}$
2: repeat
3:    Execute $a \sim \pi(a|s; \theta^{(0)})$ and observe $s', r(s,a), c(s,a)$
4:    Add tuple $(s, a, s', r(s,a), c(s,a))$ to $\mathcal{D}$
5:    Sample batch $\mathcal{B}$ of tuples from $\mathcal{D}$
6:    Critic update:
7:    $L_r\left(\psi_r^{(k)}, \phi^{(k)}\right) = \mathbb{E}_\mathcal{B}\left[\text{valueLoss}\left(s, a, s', r(s,a), Q_r, Q_r\left(s, a; \psi_r^{(k)}, \phi^{(k)}\right)\right)\right]$
8:    $L_c\left(\psi_c^{(k)}, \phi^{(k)}\right) = \mathbb{E}_\mathcal{B}\left[\text{valueLoss}\left(s, a, s', c(s,a), Q_c, Q_c\left(s, a; \psi_c^{(k)}, \phi^{(k)}\right)\right)\right]$
9:    $L_\lambda\left(\psi_\lambda^{(k)}, \phi^{(k)}\right) = \mathbb{E}_\mathcal{B}\left[\max\left(0, \Lambda\left(s; \psi_\lambda^{(k)}, \phi^{(k)}\right)\right)\left(Q_r\left(s, a; \psi_r^{(k)}, \phi^{(k)}\right) - V_r^*\right)\right]$ ▷ Equation 5, no gradient through $Q_r$
10:    $\psi_{r,c,\lambda}^{(k+1)}, \phi^{(k+1)} = \psi_{r,c,\lambda}^{(k)}, \phi^{(k)} - \eta_1 \cdot \nabla_{\psi_{r,c,\lambda}^{(k)}, \phi^{(k)}} \sum_{j \in \{r,c,\lambda\}} L_j\left(\psi_j^{(k)}, \phi^{(k)}\right)$
11:
12:    Policy update:
13:    $\theta^{(k+1)} = \theta^{(k)} + \eta_2 \cdot \mathbb{E}_\mathcal{B}\left[\text{policyGradient}\left(\theta^{(k)}, s, a, Q_r, Q_c\left(s, a; \psi_{r,c,\lambda}^{(k)}, \phi^{(k)}\right)\right)\right]$
14: until stopping criterion is met
15: return $\psi_{r,c,\lambda}^{(k+1)}, \phi^{(k+1)}$ and $\theta^{(k+1)}$

FIG. 4

ROBOT CONTROL POLICY DETERMINATION THROUGH CONSTRAINED OPTIMIZATION FOR SMOOTH CONTINUOUS CONTROL

CROSS-REFERENCE TO RELATED APPLICATIONS

This application claims the benefit under 35 U.S.C. § 119(e) of the filing date of U.S. Patent Application No. 62/737,855, for "Robot control policy determination through constrained optimization for smooth continuous control," which was filed on Sep. 27, 2018, and which is incorporated here by reference.

BACKGROUND

This specification relates to technologies for optimizing the determination of control policy parameters for vehicles and other robots through the performance of simulations of vehicles to determine control policy parameters.

SUMMARY

This specification describes technologies that efficiently determine control parameters for a physical or simulated vehicle or other robot subject to constraints on the operation of the robot.

This specification describes methods for determining vehicle and robot control policies through simulation and reinforcement learning of the policies using multi-objective optimization, which simultaneously maximizes returns and minimizes a cost function. This specification describes techniques for finding a good trade-off between cost and return, one that results in desired, smooth behavior. The techniques include an improvement on multi-objective optimization that implements constraints in a way that allows a lower bound to be placed on the return while minimizing desired quantities, e.g., control effort. Lagrangian relaxation is used to learn both (i) the parameters of a control policy that satisfies the desired constraints and (ii) the Lagrangian multipliers for the optimization. In this way, policies can be found that satisfy constraints either in expectation or in a per-step fashion. In addition, the techniques described in this specification enable a reinforcement learning system to learn a single conditional policy that is able to dynamically change the trade-off between return and cost. Also, with the addition of constraints, the effective dimensionality of the optimization problem is reduced, enabling a reinforcement learning system to solve the problem and generate good policies efficiently.

The subject matter described in this specification can be implemented in particular embodiments so as to realize one or more of the following advantages.

By applying Lagrangian relaxation in a point-wise fashion and learning the corresponding Lagrangian multipliers, a reinforcement learning system can learn a control policy that not only satisfies constraints in expectation but also in a per-step fashion, so that the vehicle or robot operates within the constraints at all times of its operation. As a result, the learned policy advantageously does not result in abrupt motions or abrupt changes in speed or direction of motion of a vehicle or robot, or in any actions that risk damage to a real-world vehicle or robot, that is operating under control of the policy. This can result in policies that are safe for real world testing of a vehicle or robot, do not lead to unnecessary wear and tear or energy consumption or excite undesired second-order dynamics in the real-world vehicle or robot. Thus, the techniques described in this specification are particularly advantageous in learning policies for continuous-time control in high dimensional continuous state-action spaces—as often encountered in robotics.

By making the Lagrangian multipliers state-dependent and adapting them alongside the policy being learned, the reinforcement learning system not only imposes constraints on expected reward or cost, but also on the instantaneous values, which allows for much tighter control over the behavior of the policy.

By having the entire constrained optimization process conditioned on the constraint bounds themselves, the reinforcement learning system can learn a single, bound-conditioned policy that is able dynamically trade-off reward and penalties. This allows the system to learn, for example, energy-efficient locomotion for a vehicle at a range of velocities.

By using Lagrangian relaxation on point-wise constraints imposed on the instantaneous values of the learned policy and learning the resulting state-dependent Lagrangian multipliers alongside the values of the policy, a control policy can be generated that efficiently and closely tracks the bounds imposed by the constraints. The policy and critic can furthermore observe and generalize across the imposed bounds, resulting in a single policy that is able to trade off reward and costs dynamically.

Each of the systems and methods described in this specification can be used to develop control policies for a variety of real-world vehicles, including an autonomous vehicles operating on legs or wheels or a flying autonomous vehicle. For vehicles with legs and that perform walking and turning actions, the control policy can define a walking and turning action. In particular, for vehicles that can perform autonomous quadruped locomotion, the control policy can define quadruped locomotion. Likewise, for a vehicle operating on wheels, the control policy can define a maneuver performed by the vehicle, which can be, for example, a parking maneuver.

Each of the systems and methods described above can be used to develop control policies for robots, including, for example, a robot arm with multiple degrees of freedom, e.g., five or more degrees of freedom, that define a motion for the robot arm. In some cases, the robot arm has an end effector and the control policy defines a motion to a target goal position.

The kinds of constraints that can be imposed on the operation of the robot include constraints on a maximum velocity or acceleration of the robot or any element of the robot; constraints on a rate of change of position, orientation, or location of the robot or any element of the robot; constraints on an angular velocity or angular acceleration of any element of the robot; constraints on a total power usage of the robot or a power usage of any element of the robot; constraints limiting to a minimum a distance between independently movable elements of the robot or between elements of the robot and objects, e.g., walls or other stationary objects, people, or other robots, in an environment in which the robot is operating; constraints limiting to a maximum an amount of force applied by elements of the robot, e.g., end effectors, to objects in the environment, e.g., to work pieces or tools; or constraints that require the robot return at a maximum time interval to a predetermined place for maintenance, e.g., checking, cleaning or replacement of parts, replacement of lubricants, calibration of elements, e.g., end effectors, motors, or sensors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows pseudocode for a constrained optimization algorithm.

Like reference numbers and designations in the various drawings indicate like elements.

DETAILED DESCRIPTION

This specification describes methods—and systems and computer programs that implement the methods—that determine control policies for continuous control problems with high-dimensional continuous state-action spaces, particularly as applied to determining control policies for robots. Determining control policies is done by solving an optimization problem, and the methods disclosed in this specification regularize the optimization problem by adding constraints, thereby reducing its effective dimensionality. Specifically, one effective constraint minimizes the penalty with respect to a lower bound on the success rate of the task to be performed by a robot. Alternatively, the constraint can maximize the success rate with respect to an upper bound on cost.

When implementing a Lagrangian relaxation technique to solve an optimization problem to determine a control policy, the methods use cost coefficients for each of the imposed constraints that are tuned automatically during the optimization process. In this way the methods can find an optimal trade-off between reward and costs, one that also satisfies the imposed constraints, automatically. By making the cost multipliers state-dependent, and adapting them alongside the policy, the methods not only impose constraints on expected reward or cost, but also on their instantaneous values. Such point-wise constraints allow for much tighter control over the behavior of the policy, in that it avoids having a constraint that is satisfied only in overall expectation but is still violated momentarily. Finally, the entire constrained optimization procedure of the methods is in some implementations conditioned on the constraint bounds themselves in order to learn a single, bound-conditioned policy that is able dynamically trade-off reward and penalties. This allows the methods to learn energy-efficient locomotion at a range of different velocities, for example.

Figure 1:
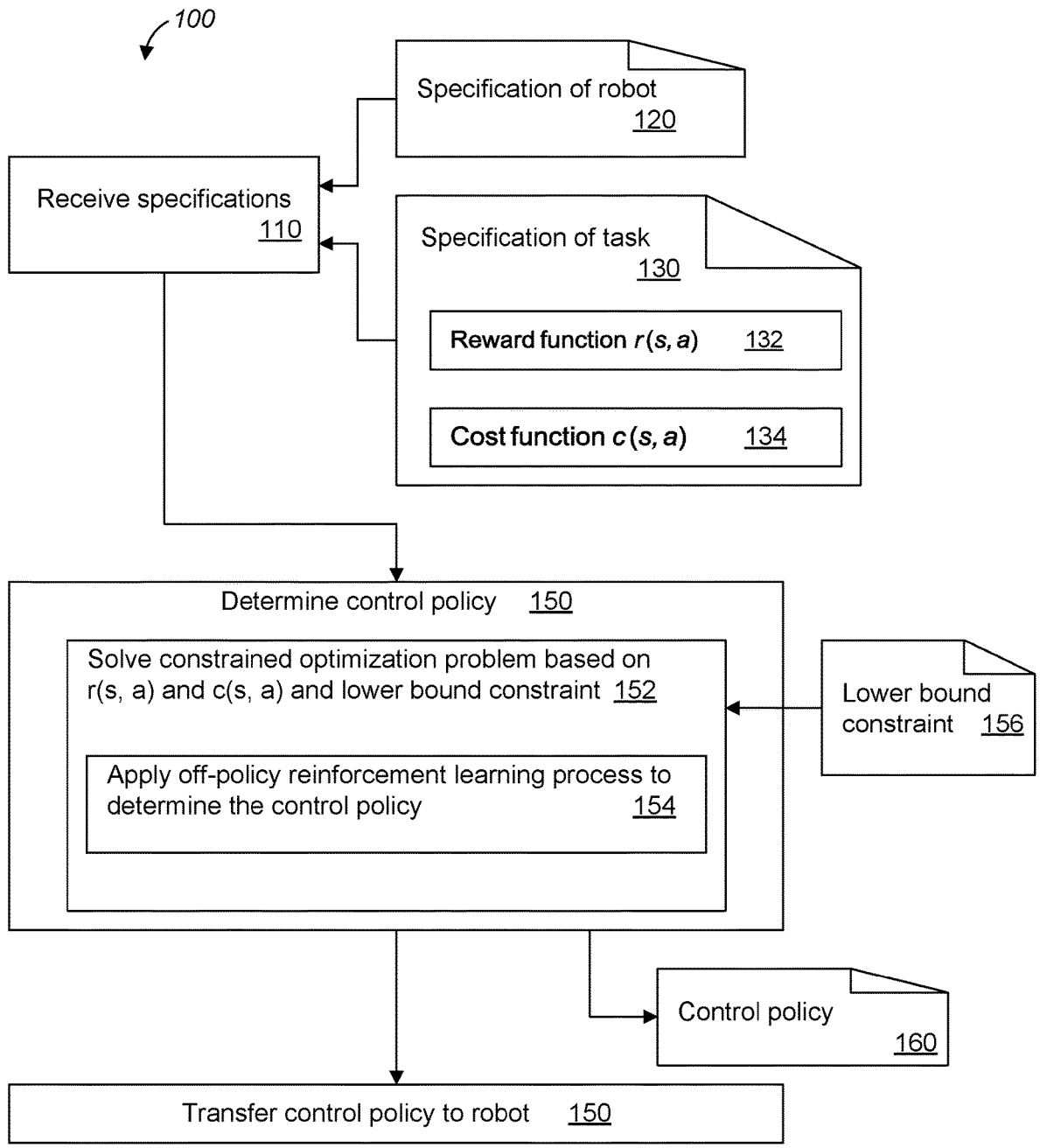
FIG. 1 is a flowchart of a method for determining a control policy for a robot.

FIG. 1 is a flowchart of a method 100 for determining a control policy for a robot. For convenience, the method will be described as being performed by a system of one or more computers, located in one or more locations, and programmed appropriately in accordance with this specification. The goal of the method is to automatically find a policy $\pi(a|s;\theta)$ with action a, state s, and parameter $\theta$, e.g., a probabilistic policy, that trades off between maximizing the (expected) reward and minimizing the cost, in order to achieve the desired behavior, e.g., solving a task, while minimizing other quantities, e.g., control effort or energy.

The system receives (110) a specification 120 of a robot and specification 130 of a task to be performed by the robot. The task is defined at least in part by a reward function r(s, a) 132, and constraints on how the task is performed are represented at least in part in a cost function c(s, a) 132. The reward and cost are functions of state s and action a. The robot is subject to constraints on the operation of the robot. The constraints include a hard constraint that is represented in the cost function as a soft constraint.

The system determines (150) the control policy 160 by solving (152) a constrained optimization problem based on the reward and cost functions. Solving the optimization problem includes applying (154) an off-policy reinforcement learning process to determine the control policy, in which any violation of the soft constraint acts as a penalty in the optimization. The optimization problem is constrained by a lower bound 156, the lower bound being a lower-bound value of estimated total return, a lower-bound value of estimated per-step return, or a lower-bound value of an estimated return in a value-space.

The control policy specifies actions based on a state of the robot and an environment of the robot. The actions results in control signals for motors of the robot.

The off-policy reinforcement learning process can implement a value-based reinforcement learning algorithm or a Maximum a Posteriori Policy Optimization (MPO) learning algorithm. MPO is an actor-critic algorithm and is used to train a neural network. In each policy improvement step, for each state sampled from a replay buffer, MPO creates a population of actions. Subsequently, these actions are re-weighted based on their estimated values such that better actions will have higher weights. Finally, MPO uses a supervised learning step to fit a new policy in continuous state and action space.

In some cases, the hard constraint is an absolute torque or energy output applied to any motor of the robot by the control policy.

In some implementations, the control policy for the robot is a parameterized control policy. In some implementations, the control policy is a stochastic policy.

In some implementations, the state is determined at least in part from sensors of the robot. The state can include observation values of noisy motor positions, an orientation estimate, and angular velocity and accelerometer readings from an inertial measurement unit of the robot.

In some implementations, the cost c(s, a) includes a total power usage of the robot. The total power usage in some implementations is a power usage of motors of the robot according to an actuator model.

In some implementations, the cost function $Q_c(s, a)$ is split into separate value functions for (i) power usage and (ii) a contact penalty imposed when an element of the robot improperly contacts another element of the robot.

In some implementations, task success is formulated as a hard constraint on the reward. Fulfilling this constraint indicates task success. Generally the constraint is not satisfied at the start of learning, as the agent first needs to learn how to solve the task. In some implementations, solving the constrained optimization problem is thus done by solving the constrained optimization problem with Lagrangian relaxation with a Lagrangian multiplier $\lambda$ and with a minimization objective over $\lambda$ and the control policy. In this setting, because the hard constraint is generally not satisfied at the start of learning, the hard constraint is relaxed into a soft constraint, where any constraint violation acts as a penalty for the optimization. The penalty is the magnitude of the soft constraint violation, which affects the optimization objective. The soft constraint violation changes $Q_r$ and $Q_c$ indirectly through changes to $\lambda$, an optimization objective, and eventually the policy being evaluated by $Q_r$ and $Q_c$. In these implementations, the constrained optimization problem has the form $$\max_\pi \min_{\lambda \geq 0} \mathbb{E}_{s, a \sim \pi}[Q_\lambda(s, a)],$$

$$\text{with } Q_\lambda(s, a) = \lambda(Q_r(s, a) - \overline{V}_r) - Q_c(s, a)$$

where $\pi$ is the control policy, $Q_\lambda$ is an estimated value of $\lambda$ and $\overline{V}_r$ is the lower bound. An estimate of the expected discounted return for a given policy is defined as the action-value function a $Q_r(s,a) = \mathbb{E}_{s, a \sim \pi}[\Sigma_t \gamma^t \cdot r(s_t, a_t) | s_0 = s, a_0 = a]$ and $Q_c(s,a)$ is a similarly constructed expected discounted cost action-value function. $\overline{V}_r$ is a lower-bound value of an estimated return in a value-space and is defined by $\mathbb{E}_{s, a \sim \pi}[Q_r(s,a)] \geq \overline{V}_r$. In some of these implementations, the estimated value is $\overline{V}_r = \overline{r}/(1-\gamma)$, where $\overline{r}$ is the lower bound, and $\overline{r}$ is a lower-bound value of a per-step reward and defined by $\mathbb{E} s, a \sim \pi[r(s,a)] \geq \overline{r}$, and $\gamma$ is a discount $0 \leq \gamma < 1$. Solving the constrained optimization problem with Lagrangian relaxation with the Lagrangian multiplier $\lambda$ can include iteratively updating $\lambda$ by gradient descent on $Q_\lambda(s, a)$, alternated with policy optimization, until $\nabla_\lambda \mathbb{E}[Q_\lambda(s,a)] = 0$.

In some implementations of solving the constrained optimization problem with Lagrangian relaxation, the constrained optimization problem includes a set of point-wise constraints, one for each state induced by the control policy; the Lagrangian relaxation is done using state-dependent Lagrangian multipliers $\lambda(s)$; and the optimization problem is $$\max_\pi \mathbb{E}_{s \sim \pi}\left[\min_{\lambda(s) \geq 0} \mathbb{E}_{a \sim \pi}[Q_\lambda(s, a)]\right],$$

$$\text{with } Q_\lambda(s, a) = \lambda(s)(Q_r(s, a) - \overline{V}_r) - Q_c(s, a).$$

In this case, the assumption is made that nearby states have similar $\lambda$ multipliers. This allows learning a parametric function $\lambda(s)$ alongside the action-value, which can generalize to unseen states s. Advantageously, a single critic model can be trained that outputs $\lambda(s)$ as well as $Q_c(s, a)$ and $Q_r(s, a)$. This off-policy reinforcement learning process implements an actor-critic model and includes training a critic model that outputs $\lambda(s)$, a state-dependent Lagrangian multiplier, and $Q_c(s, a)$ and $Q_r(s, a)$.

FIG. 4 shows pseudocode for the resulting foregoing constrained optimization algorithm.

In some implementations of solving the constrained optimization problem with Lagrangian relaxation, the solving includes learning a goal-conditioned policy for multiple values of the lower bound $\overline{V}_r$ by conditioning the policy, value function and Lagrangian multipliers on the desired target value and learning a bound-conditioned policy $$\mathbb{E}_{z \sim p(z)}\left[\max_{\pi(z)} \mathbb{E}_{s \sim \pi(z)}\left[\min_{\lambda(s, z) \geq 0} \mathbb{E}_{a \sim \pi(z)}[Q_\lambda(s, a, z)]\right]\right],$$

$$\text{with } Q_\lambda(s, a, z) = \lambda(s, z)(Q_r(s, a, z) - \overline{V}_r(z)) - Q_c(s, a, z),$$

where z is a goal variable that is observed by the policy and by the critic and maps to a lower bound for $\overline{V}_r(z)$.

The system can be used to determine a control policy for a variety of kinds of robots. For example, the robot can be an autonomous vehicle operating on legs or wheels, or it can be a flying autonomous vehicle. If the robot has legs it can be operable to perform walking and turning actions, in which case the control policy defines walking and turning actions. In particular, if the robot is a quadruped, the control policy defines autonomous quadruped locomotion. As another example, if the robot is a vehicle operating on wheels, the control policy can define a maneuver performed by the vehicle. In that case, if the robot is a self-driving car, the maneuver can be a parking maneuver. As another example, if the robot is a robot arm with multiple degrees of freedom, for example, five or more degrees of freedom, the control policy can define a motion for the robot arm. Or, if the robot arm has an end effector, the control policy can define a motion to a target goal position.

Figure 2:
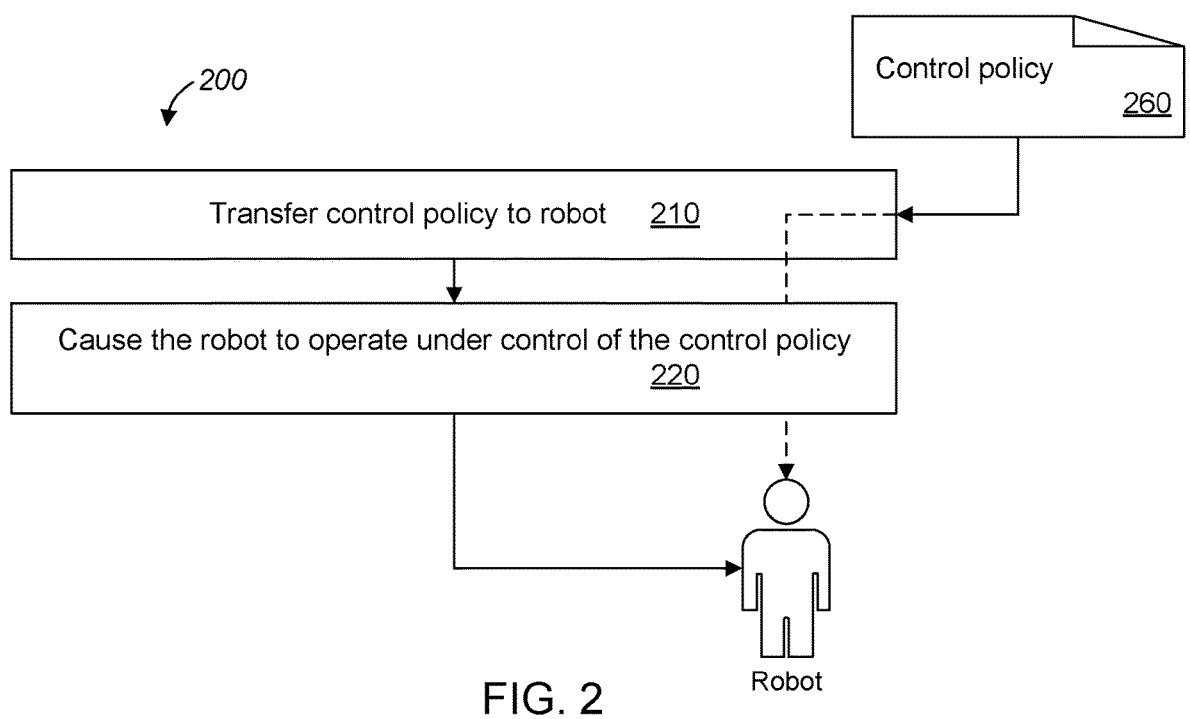
FIG. 2 is a flowchart of a method for using a control policy for a robot.

FIG. 2 is a flowchart of a method 200 for using a control policy for a robot.

Having determined a control policy as described above, the system can transfer (210) the determined control policy 260 to a robot specified by the specification of a robot that was used to determine the control policy. The system can then cause (220) the robot to operate under control of the control policy. These actions can be performed in response to a request from a human operator, for example.

Figure 3:
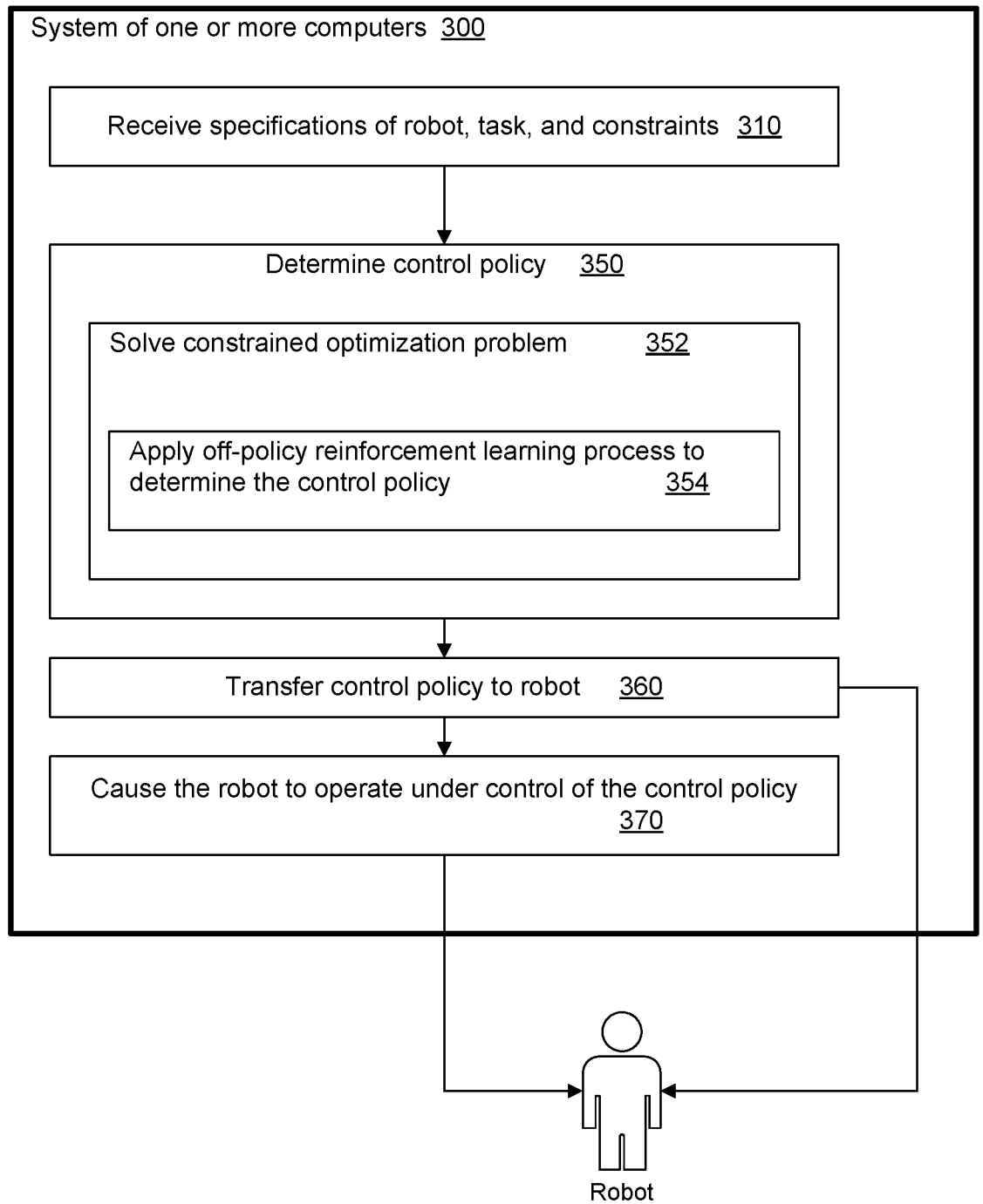
FIG. 3 is a block diagram illustrating a system of one or more computers for determining a control policy for a robot.

FIG. 3 is a block diagram illustrating a system 300 of one or more computers for determining a control policy for a robot. Included in the system are one or more storage devices on which are stored instructions that are operable, when executed by the one or more computers of the system, to cause them to perform operations described above in reference to FIG. 1 and FIG. 2. The instructions include instructions 310 configured to perform operations to receive specifications of a robot, a task, and one or more corresponding constraints; and instructions 350 to determine a control policy for the robot to perform the task subject to the one or more constraints. The instructions to determine the control policy include instructions 352 to solve a constrained optimization problem including instructions 354 to apply off-policy reinforcement learning process to determine the control policy. The system can optionally include instructions 360 to transfer the control policy to the robot and instructions 370 to cause the robot to operate under control of the control policy.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for determining a control policy for a robot that is subject to constraints on operation of the robot, the method comprising:
receiving a specification of a robot and a task to be performed by the robot, wherein the task is defined at least in part by a reward function r(s, a) and the constraints on the operation of the robot are represented at least in part in a cost function c(s, a), and the control policy specifies an action a based on a states of the robot and an environment of the robot, the action resulting in control signals for motors of the robot;
wherein success in performing the task by the robot is formulated as a hard constraint on a reward received by the robot, the hard constraint being a set of point-wise constraints, one for each state induced by the control policy;
determining the control policy by solving a constrained optimization problem based on the reward and cost functions,
wherein success in performing the task is represented by a lower bound on the constrained optimization problem, the lower bound being a lower-bound value on a measure of a return received by the robot, and
wherein solving the constrained optimization problem comprises solving the constrained optimization problem with Lagrangian relaxation with state-dependent Lagrangian multipliers $\lambda(s)$ through applying an off-policy reinforcement learning process;
transferring the determined control policy to the robot; and
causing the robot to operate under control of the determined control policy.

2. The method of claim 1, wherein the measure of the return received by the robot is an estimated total return, an estimated per-step return, or an estimated return in a value-space.

3. The method of claim 1, wherein the off-policy reinforcement learning process implements a Maximum a Posteriori Policy Optimization (MPO) learning algorithm.

4. The method of claim 1, wherein the off-policy reinforcement learning process implements a value-based reinforcement learning algorithm.

5. The method of claim 1, wherein:
the optimization problem is $$\max_{\pi} \mathbb{E}_{s \sim \pi} \left[ \min_{\lambda(s) \geq 0} \mathbb{E}_{a \sim \pi} [Q_\lambda(s, a)] \right],$$

with $Q_\lambda(s, a) = \lambda(s)(Q_r(s, a) - \bar{V}_r) - Q_c(s, a)$, wherein $\pi$ is the control policy, $Q_r$ is an estimated return, $Q_c$ is an estimated discounted cost,
wherein $\bar{V}_r$ is a lower-bound value of an estimated return in a value-space.

6. The method of claim 5, wherein $\bar{V}_r$ is $\bar{V}_r = \bar{r}/(1-\gamma)$, $\bar{r}$ where $\bar{r}$ is a lower-bound value of a per-step reward $\mathbb{E}\ s, a \sim \pi[r(s, a)] \geq \bar{r}$ and $\gamma$ is a discount $0 \leq \gamma < 1$.

7. The method of claim 5, wherein the off-policy reinforcement learning process implements an actor-critic model and comprises:
training a critic model that outputs $\lambda(s)$ and $Q_c(s, a)$ and $Q_r(s, a)$.

8. The method of claim 7, further comprising:
learning a goal-conditioned policy for multiple values of the lower bound $\bar{V}_r$ by conditioning the goal-conditioned policy, $Q_r$, and Lagrangian multipliers on the desired target value and learning a bound-conditioned policy $$\mathbb{E}_{z \sim p(z)} \left[ \max_{\pi(z)} \mathbb{E}_{s \sim \pi(z)} \left[ \min_{\lambda(s, z) \geq 0} \mathbb{E}_{a \sim \pi(z)} [Q_\lambda(s, a, z)] \right] \right],$$

with $Q_\lambda(s, a, z) = \lambda(s, z)(Q_r(s, a, z) - \bar{V}_r(z)) - Q_c(s, a, z)$, where z is a goal variable that to a lower bound for $\bar{V}_r(z)$.

9. The method of claim 5, wherein $Q_c(s, a)$ is split into separate value functions for (i) power usage and (ii) a contact penalty imposed when an element of the robot improperly contacts another element of the robot.

10. The method of claim 1, wherein the control policy for the robot is a parameterized control policy.

11. The method of claim 1, wherein the control policy specifying actions is a stochastic policy.

12. The method of claim 1, wherein the state is determined at least in part from sensors of the robot.

13. The method of claim 1, wherein the state includes observation values of noisy motor positions, an orientation estimate, and angular velocity and accelerometer readings from an inertial measurement unit of the robot.

14. The method of claim 1, wherein:
the constraints on the operation of the robot include a constraint on energy output applied to any motor of the robot by the control policy.

15. The method of claim 1, wherein the cost function c(s, a) includes a total power usage of the robot.

16. The method of claim 15, wherein the total power usage is a power usage of motors of the robot according to an actuator model.

17. The method of claim 1, wherein:
the robot has legs and is operable to perform walking and turning actions; and
the control policy defines a walking and turning action.

18. The method of claim 17, wherein:
the robot is operable to perform autonomous quadruped locomotion; and
the control policy defines quadruped locomotion.

19. The method of claim 1, wherein:
the robot is a vehicle operating on wheels; and the control policy defines a maneuver performed by the vehicle.

20. The method of claim 19, wherein the robot is a self-driving car.

21. The method of claim 1, wherein:
the robot is a robot arm with multiple degrees of freedom; and
the control policy defines a motion for the robot arm.

22. The method of claim 21, wherein:
the robot arm has an end effector; and
the control policy defines a motion to a target goal position.

23. A computer storage medium encoded with instructions that, when executed by one or more computers, cause the one or more computers to implement a system to perform operations for determining a control policy for a robot that is subject to constraints on operation of the robot, the operations comprising:
receiving a specification of a robot and a task to be performed by the robot, wherein the task is defined at least in part by a reward function r(s, a) and the constraints on the operation of the robot are represented at least in part in a cost function c(s, a), and the control policy specifies an action a based on a states of the robot and an environment of the robot, the action resulting in control signals for motors of the robot;
wherein success in performing the task by the robot is formulated as a hard constraint on a reward received by the robot, the hard constraint being a set of point-wise constraints, one for each state induced by the control policy;
determining the control policy by solving a constrained optimization problem based on the reward and cost functions,
wherein success in performing the task is represented by a lower bound on the constrained optimization problem, the lower bound being a lower-bound value on a measure of a return received by the robot, and
wherein solving the constrained optimization problem comprises solving the constrained optimization problem with Lagrangian relaxation with state-dependent Lagrangian multipliers λ(s) through applying an off-policy reinforcement learning process;
transferring the determined control policy to the robot; and
causing the robot to operate under control of the determined control policy.

24. The computer storage medium of claim 23, wherein the measure of the return received by the robot is an estimated total return, an estimated per-step return, or an estimated return in a value-space.

25. A system comprising:
one or more computers and one or more storage devices on which are stored instructions that are operable, when executed by the one or more computers, to cause the one or more computers to perform operations for determining a control policy for a robot that is subject to constraints on operation of the robot, the operations comprising:
receiving a specification of a robot and a task to be performed by the robot, wherein the task is defined at least in part by a reward function r(s, a) and the constraints on the operation of the robot are represented at least in part in a cost function c(s, a), and the control policy specifies an action a based on a states of the robot and an environment of the robot, the action resulting in control signals for motors of the robot;
wherein success in performing the task by the robot is formulated as a hard constraint on a reward received by the robot, the hard constraint being a set of point-wise constraints, one for each state induced by the control policy;
determining the control policy by solving a constrained optimization problem based on the reward and cost functions,
wherein success in performing the task is represented by a lower bound on the constrained optimization problem, the lower bound being a lower-bound value on a measure of a return received by the robot, and
wherein solving the constrained optimization problem comprises solving the constrained optimization problem with Lagrangian relaxation with state-dependent Lagrangian multipliers λ(s) through applying an off-policy reinforcement learning process;
transferring the determined control policy to the robot; and
causing the robot to operate under control of the determined control policy.

26. The system of claim 25, wherein the measure of the return received by the robot is an estimated total return, an estimated per-step return, or an estimated return in a value-space.

* * * * *